United States Patent
Ghosh et al.

(10) Patent No.: US 12,147,532 B2
(45) Date of Patent: Nov. 19, 2024

(54) PERFORMANCE MONITORING UNIT OF A PROCESSOR DETERRING TAMPERING OF COUNTER CONFIGURATION AND ENABLING VERIFIABLE DATA SAMPLING

(71) Applicant: Intel Corporation, Santa Clara, CA (US)

(72) Inventors: Rahuldeva Ghosh, Portland, OR (US); Zheng Zhang, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 421 days.

(21) Appl. No.: 17/539,698

(22) Filed: Dec. 1, 2021

(65) Prior Publication Data

US 2022/0092174 A1    Mar. 24, 2022

(51) Int. Cl.
*G06F 21/71* (2013.01)
*G06F 9/455* (2018.01)
(Continued)

(52) U.S. Cl.
CPC .......... *G06F 21/54* (2013.01); *G06F 11/3466* (2013.01); *G06F 21/44* (2013.01);
(Continued)

(58) Field of Classification Search
CPC ...... G06F 21/54; G06F 11/3466; G06F 21/44; G06F 21/566; G06F 21/57; G06F 21/71;
(Continued)

(56) References Cited

U.S. PATENT DOCUMENTS

| | | | |
|---|---|---|---|
| 5,729,726 A * | 3/1998 | Levine | G06F 11/3466 714/E11.2 |
| 8,904,392 B2 * | 12/2014 | Chiu | G06F 11/3409 718/100 |

(Continued)

FOREIGN PATENT DOCUMENTS

| | | |
|---|---|---|
| CN | 116204869 | 6/2023 |
| EP | 4191456 | 6/2023 |
| JP | 2023-081834 | 6/2023 |

OTHER PUBLICATIONS

Extended European Search Report for EP Application No. 22200844.3, mailed Apr. 20, 2023, 5 pages.

*Primary Examiner* — Joseph P Hirl
*Assistant Examiner* — Aayush Aryal
(74) *Attorney, Agent, or Firm* — JAFFERY WATSON MENDONSA & HAMILTON LLP

(57) ABSTRACT

A secure performance monitoring unit of a processor includes one or more performance monitoring counters and a secure group manager. The secure group manager is configured to receive a request to create a secure counter group from a software (SW) process being executed by a processor, the request including identification of the one or more counters; determine availability of the one or more counters, creating the secure counter group, assign the one or more counters to the secure counter group, and save a public key of the SW process, when the one or more counters are available; receive and save a private key for the secure counter group; receive a request to configure the secure counter group from the SW process; verify the configuration using the public key of the SW process; and begin sampling of the one or more counters when the configuration is verified.

20 Claims, 7 Drawing Sheets

(51) Int. Cl.
*G06F 11/34* (2006.01)
*G06F 21/44* (2013.01)
*G06F 21/53* (2013.01)
*G06F 21/54* (2013.01)
*G06F 21/55* (2013.01)
*G06F 21/56* (2013.01)
*G06F 21/57* (2013.01)
*G06F 21/60* (2013.01)
*G06F 21/64* (2013.01)
*H04L 9/08* (2006.01)
*H04L 9/32* (2006.01)

(52) U.S. Cl.
CPC ............ *G06F 21/566* (2013.01); *G06F 21/57* (2013.01); *H04L 9/3242* (2013.01)

(58) Field of Classification Search
CPC .. G06F 2201/88; G06F 11/3409; G06F 21/53; G06F 9/45558; G06F 21/55; G06F 21/602; G06F 21/64; G06F 2009/45587; G06F 2009/45591; H04L 9/3242; H04L 9/0833; H04L 9/3255
See application file for complete search history.

(56) References Cited

U.S. PATENT DOCUMENTS

| | | |
|---|---|---|
| 2011/0145651 A1* | 6/2011 | Molnar ............... G06F 11/3612 714/38.1 |
| 2011/0145829 A1 | 6/2011 | Molnar et al. |
| 2011/0173431 A1 | 7/2011 | Salapura et al. |
| 2013/0151837 A1* | 6/2013 | Frazier ................ G06F 11/1438 713/100 |
| 2016/0179650 A1* | 6/2016 | Yasin .................. G06F 11/3466 714/47.1 |
| 2017/0220447 A1* | 8/2017 | Brandt ................ G06F 11/3466 |
| 2018/0183814 A1* | 6/2018 | Sambandam ........... G06F 21/56 |

* cited by examiner

PERFORMANCE MONITORING UNIT OF A PROCESSOR DETERRING TAMPERING OF COUNTER CONFIGURATION AND ENABLING VERIFIABLE DATA SAMPLING

FIELD

Embodiments relate generally to computer security, and more particularly, to protecting access to counters in a performance monitoring unit of a processor in a computing system.

BACKGROUND

Existing performance monitoring units (PMUs) of processors are not designed to support security related profiling use cases. Existing PMUs are composed of a single user intellectual property (IP) block without a hardware-based arbitration mechanism. There is also no hardware-based mechanism to manage access to telemetry data for a specified process/container/virtual machine (VM) running on the processor. As a result, security related use cases, such as monitoring for malicious activities by untrusted processes, relies heavily on existing PMU sampling techniques that expose the sampling data and monitoring stack to user space interference and/or attacks.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

Implementations of the technology described herein provide a method and system to securely configure a specific set of PMU counters for use by a software (SW) process that cannot be altered by other SW processes and to verify that associated data read from PMU counters has not been tampered with in the data path from the counter to the SW process. Embodiments provide a secure PMU (SPMU) within a processor that enables creation of secure counter groups in the SPMU with tamper-proof configurations and hardware (HW) root of trust (RoT)-backed verifiable counter data for security uses.

Embodiments provide a secure PMU extension augmenting an existing performance monitoring unit (PMU) IP block in a processor for enabling secure grouping of a specified set of PMU counters and allow for SW processes sampling data from the counters to verify the counter data with a HW RoT-backed public key. The secure extension comprises a new operational mode of the PMU that may be implemented, in an embodiment, with microcode. The SPMU introduces a dedicated set of performance monitoring counters (e.g., sets of two, four, eight or more counters, depending on capabilities of the processor) that can be programmed for managed access by a plurality of SW processes. The SW process (e.g., security SW running on the processor) setting up a secure counter group in the SPMU is cryptographically bound with the secure counter group that the SW process creates. The data gathered from the counters of the secure counter group are signed by a HW RoT-based key and copied to a set of model specific registers (MSRs), along with a signature, to be verified by the SW process that was assigned the secure counter group. Verification of counter data is done by a signing key with an HW RoT-backed public certificate maintained by the SPMU.

Figure 1:
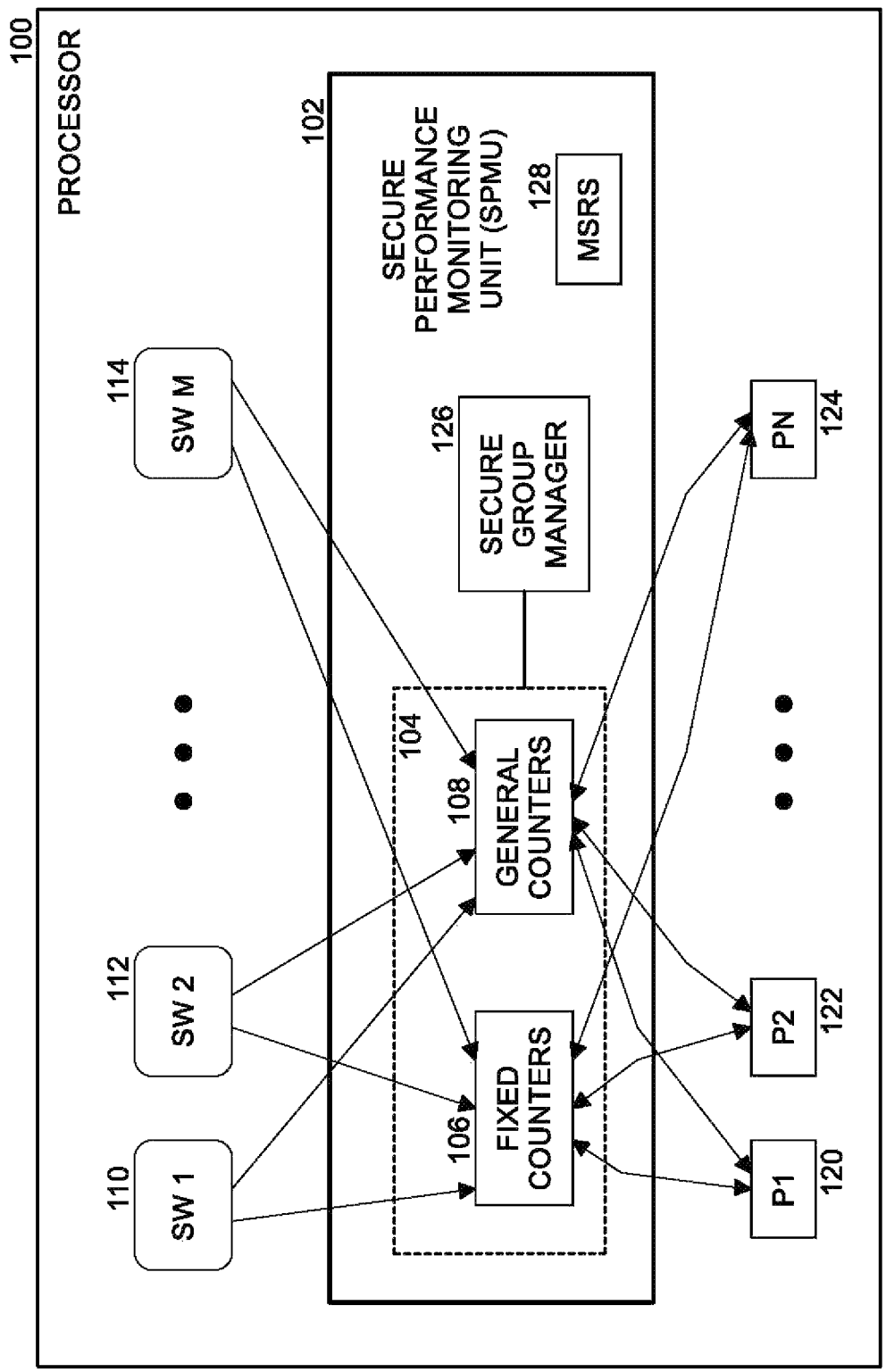
FIG. 1 is a diagram of a processor including a secure performance monitoring unit (SPMU) according to some embodiments.

FIG. 1 is a diagram of a processor 100 including a SPMU 102 according to some embodiments. Processor 100 includes any number of hardwired or configurable circuits, some or all of which may include programmable and/or configurable combinations of electronic components, semiconductor devices, and/or logic elements that are disposed partially or wholly in a personal computer (PC), server, mobile phone, tablet computer, or other computing system capable of executing processor-readable instructions. SPMU 102 circuitry includes any number and/or combination of any currently available or future developed electronic devices and/or semiconductor components capable of monitoring one or more performance aspects and/or parameters of processor 100. SPMU 102 may have any number and/or combination of performance monitoring counters 104. Counters 104 are circuitry or logic elements used to count events that occur during processing by processor 100. In embodiments, SPMU 102 includes circuitry to monitor, track, and/or count processor activity. For example, in an Intel® processor, SPMU 102 circuitry may be at least partially included or otherwise embodied in a performance monitoring unit (PMU).

In some implementations, SPMU 102 may include one or more configurable or programmable elements, such as one or more configurable integrated circuits, capable of executing machine-readable instruction sets that cause the configurable or programmable elements to combine in a particular manner to create the SPMU 102 circuitry. In some implementations, the SPMU 102 circuitry may include one or more stand-alone devices or systems, for example, the SPMU 102 circuitry may be embodied in a single surface- or socket-mount integrated circuit. In other implementations, the SPMU 102 circuitry may be provided in whole or in part via one or more processors, controllers, digital signal processors (DSPs), reduced instruction set computers (RISCs), systems-on-a-chip (SOCs), application specific integrated circuits (ASICs) capable of providing all or a portion of processors 100.

The counters 104 may include any number and/or combination of currently available and/or future developed electrical components, semiconductor devices, and/or logic elements capable of monitoring, tracking, and/or counting events in processor 100. Counters 104 include fixed counters 106 and general counters 108. Fixed counters 106 include a plurality of counters that are permanently assigned to monitor, track, and/or count a specified event in processor 100. General counters 108 include a plurality of counters that may be programmed by firmware to monitor, track, and/or count a defined event or condition in processor 100.

In an embodiment, processor 100 includes a plurality of processing cores P1 120, P2 122, ... PN 124, where N is a natural number. Processing cores P1 120, P2 122, ... PN 124 may read and/or write any of the fixed counters 106 and/or general counters 108. SPMU 102 includes a plurality of model specific registers (MSRs) 128 to store information to be read and/or written by the plurality of processing cores P1 120, P2 122, ... PN 124.

Processor 100 executes instructions for a plurality of SW processes SW 1 110, SW 2 112, ... SW M 114, where M is a natural number. The SW processes may read and/or write MSRs 128. In existing PMUs, SW processes SW 1 110, SW 2 112, ... SW M 114 can access a PMU to program counters and read their data. Existing PMUs allow SW processes sampling counter data from the PMU full and unrestricted access to all counters and any SW process can override the sampling configuration set by another SW process. This can result in misconfiguration of counters 104 and, for example, SW 1 110 may read counter data configured by SW 2 112 without knowing that the counter data is configured by another SW process. This can also lead to malicious attacks, especially if the PMU counter data is being used for security purposes.

This lack of control over access to PMU counters is overcome by the technology described herein. In an embodiment, processor 100 includes a SPMU 102 including secure group manager 126 circuitry to securely manage access to fixed counters 106 and general counters 108. Secure group manager creates secure counter groups, manages sampling of data from counters 104, and deletes secure counter groups.

The secure group manager 126 circuitry may include any number and/or combination of currently available and/or future developed electrical components, semiconductor devices, and/or logic elements capable of managing secure counter groups. In an embodiment, the secure group manager 126 may be formed by the execution of machine-readable instruction sets associated with an application and/or service executed in ring 0 kernel space. In embodiments, SPMU 102 may provide some or all the secure group manager 126 circuitry. In other embodiments, the processor 100 may provide some or all the secure group manager 126 circuitry upon executing one or more machine readable instruction sets.

Although not depicted in FIG. 1, in embodiments, a memory or similar storage device may be coupled to the SPMU 102 circuitry. The SPMU 102 may cause the storage of some or all the data from counters 104 in the memory or storage device. In at least some embodiments, some or all the data stored in the memory or storage device may be accessible to a user of processor 100.

Figure 2:
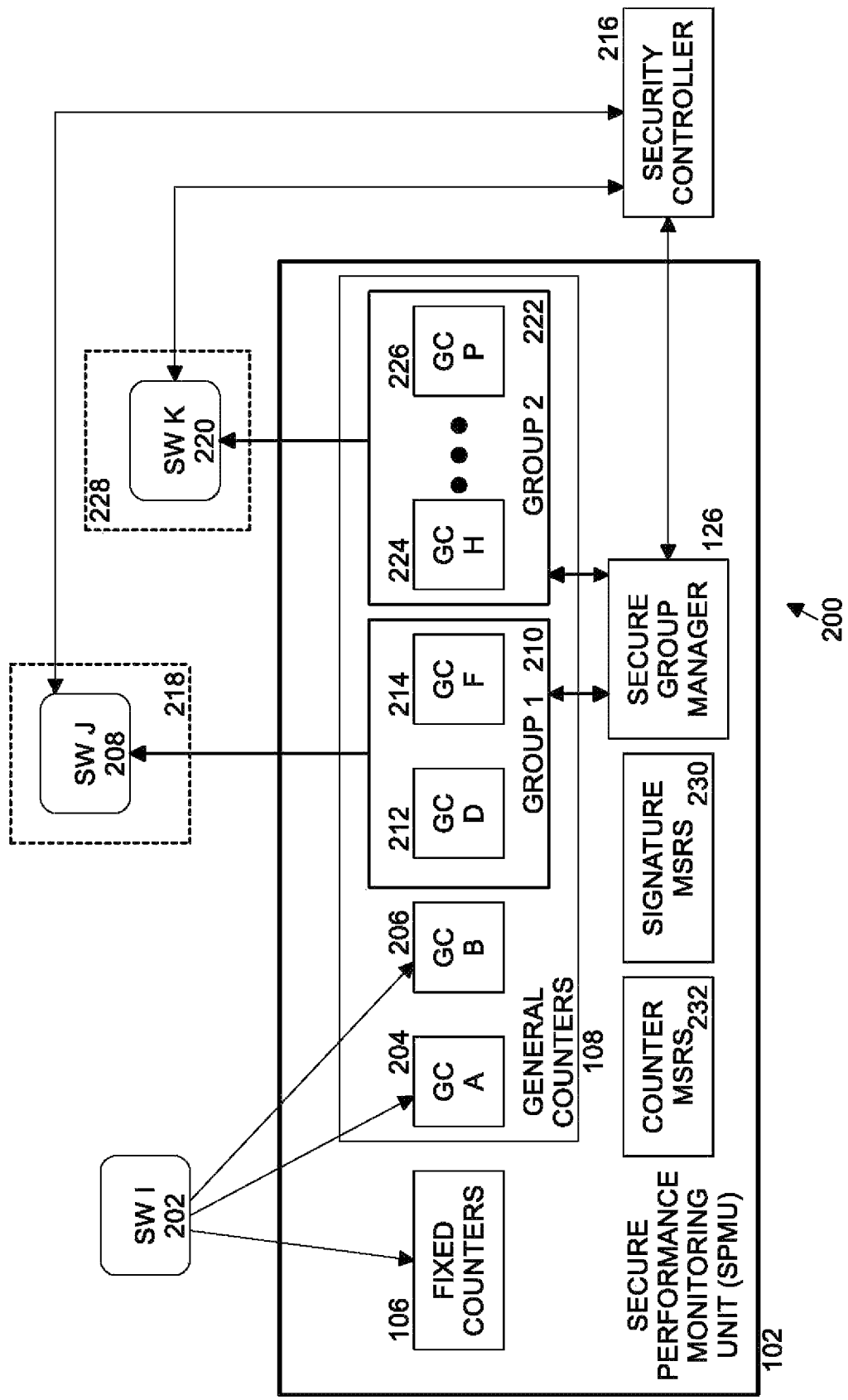
FIG. 2 is a diagram of a SPMU arrangement according to some embodiments.

FIG. 2 is a diagram of a SPMU arrangement 200 according to some embodiments. Secure group manager 126 circuitry in SPMU 102 manages creation, deletion, and runtime operations of secure container groups, and verifies secure counter group configuration updates. Secure group manager 126 creates one or more secure groupings of a specified set of counters 104 (e.g., zero or more fixed counters and zero or more general counters) and allows SW processes sampling counter data to verify the counter data with a HW RoT-backed public key. Any SW process (such as SW I 202, SW J 208, and SW K 228, which are examples of SW processes SW 1 110, SW 2 112, ... SW M 114 of FIG. 1) can configure a dedicated set of fixed counters 106 and/or general counters 108 (e.g., sets of two, four, or eight counters, more or less depending on capabilities of processor 100) that can be programmed to track one or more events occurring during processing by processor 100.

A set of assigned counters is referred to herein as a secure counter group. The SW process setting up a secure counter group (e.g., security SW) is cryptographically bound with the secure counter group and will be considered to 'own' that group. For example, SW I 202 may read one or more of a selected one or more of fixed counters 106 and general counter (GC) A 204 and GC B 206. In this example, no secure counter group is created, and no security is provided by SPMU to manage access to these counters. For example, another SW process, SW J 208, may request that secure group manager 126 create a secure group, such as group 1 210, that includes GC D 212 and GC F 214. Once this secure counter group is created, only SW J 208 may configure the counters in the group. This security arrangement is shown in FIG. 2 by the dashed box 218 for SW J 208. For example, another SW process, SW K 220, may request that secure group manager 126 create another secure group, such as group 2 222, that includes GC H 224, ... GC P 226. Once this secure counter group is created, only SW K 220 may configure the counters in the group. This security arrangement is shown in FIG. 2 by the dashed box 228 for SW K 220. Generally, only the SW process that requested the creation of the secure counter group by SPMU 102 can configure and verify counters in that group. Counters are assigned exclusively to a one secure counter group at a time (e.g., a counter cannot be assigned to two or more groups simultaneously). Once assigned to a first secure counter group, a counter cannot be assigned to a second secure counter group until the first secure counter group is deleted. This provides additional security over SW processes reading counters that is not present in existing PMUs and/or processors.

In an embodiment, SPMU 102 generates a performance monitoring interrupt (PMI) when one or more of the events represented by counters in a secure counter group either crosses a predetermined threshold or completes a sampling interval. When a PMI is generated, the SW process that requested creation of the secure counter group in response to the PMI reads the counters of the secure counter group. In an embodiment, all counters in the group are read since the signature is on a hash of all counters combined.

Data from a secure counter group data is signed by a HW RoT-based key and copied to one or more MSRs 128, along with a signature of the hash of the combined counter data, to be read by the SW process that owns the secure counter group. A new set of MSRs, called signature MSRs 230 herein, is introduced to enable reading of the secure counter group signature. For example, for SW J 208, a signature $S1=\{GC\ D\|GC\ F\}P_{priv}$ (where $P_{priv}$ is a private key for the secure counter group) may be stored in a signature MSR. For example, for SW K 220, a signature $S2=\{GC\ H\| \ldots \|GC\ P\}P_{priv}$ may be stored in another signature MSR. Although the box representing signature MSRs 230 is shown in FIG. 2 as being not within any secure counter group (e.g., group 1 210, group 2 222), each secure counter group is associated, upon creation, with one of the signature MSRs 230. SPMU 102 includes a plurality of counter MSRs 232 to control counters 104. Each counter is associated with one or more counter MSRs. In an embodiment, there are two counter MSRs for each counter—one for configuring the counter and one for reading counter data.

In an embodiment, SPMU 102 performs counter data verification using a RoT-backed public certificate maintained by the SPMU. SPMU secure group setup and key exchange are be done through an auxiliary security channel represented in FIG. 2 as security controller 216. In various embodiments, security controller 216 may be implemented as converged security management engine (CSME), enhanced security engine (ESE), hardware security processor (HSP) (e.g., Pluton available from Microsoft® or Titan available from Google® for client devices) or baseboard management controller (BMC) (for servers). In other embodiments, a SW process may verify the counter data in existing secure endpoint containers such as Secure Guard Extensions (SGX), Trust Domain Extensions (TDX) or remotely in a server accessible over a network.

Embodiments described herein make use of cryptographic keys. Each SW process (e.g., SW 1 110, SW 2 112, ... SW M 114 of FIG. 1, or SW I 202, SW J 208, and SW K 220 of FIG. 2) requesting a secure counter group has a cryptographic key pair $S_{pub}$, $S_{priv}$ with $S_{pub}$ being the public key and $S_{priv}$ being the private key. $S_{pub}$ is shared with the SPMU during creation of a secure counter group. Subsequent updates to the secure counter group's counter configuration are required to be signed with the private key $S_{priv}$. This ensures only the secure counter group's creator/owner may update the group's configuration. Each SW process maintains $S_{priv}$ and may store $S_{priv}$ in a secure location (e.g., a trusted platform module (TPM), CSME, in the cloud, etc.).

Each created secure counter group is associated with a cryptographic key pair $P_{pub}$, $P_{priv}$ and an associated digital certificate $P_{pubCert}$. The private key $P_{priv}$ is not disclosed outside of the SPMU. The public key $P_{pub}$ of the secure counter group is shared by SPMU 102 with the sampling SW process that requested the group's creation. A public certificate $P_{pubCert}$ bound to a HW RoT for processor 100 is shared to validate $P_{pub}$. Counter data from a secure counter group is signed by SPMU with the private key $P_{priv}$ associated with the secure counter group. This enable the SW process to verify that the counter data has not been tampered within the data path from the SPMU to the SW process. In an embodiment, the secure counter group private key $P_{priv}$ is maintained in the SPMU internal secure storage and never exposed outside the SPMU in processor 100 or in a computing system having the processor. In an embodiment, processor 100 may generate derivative private keys and certificates for one or more boot sessions to provide additional security.

Keys and certificates associated with SPMU 102 configuration are exchanged through an auxiliary security channel denoted security controller 216 in FIG. 2 using existing well-known protocols. The data signing protocol and verification processes are not described herein as several options are available that can be used, such as hash-based message authentication code (HMAC)-secure hash algorithm (SHA) 256/SHA384/512, etc. In an embodiment, a SPMU implementation may truncate the hash length to fit into limited MSR space available in processor 100. In an embodiment, the functionality of security controller 216 as described herein may be included in SPMU 102.

Figure 3:
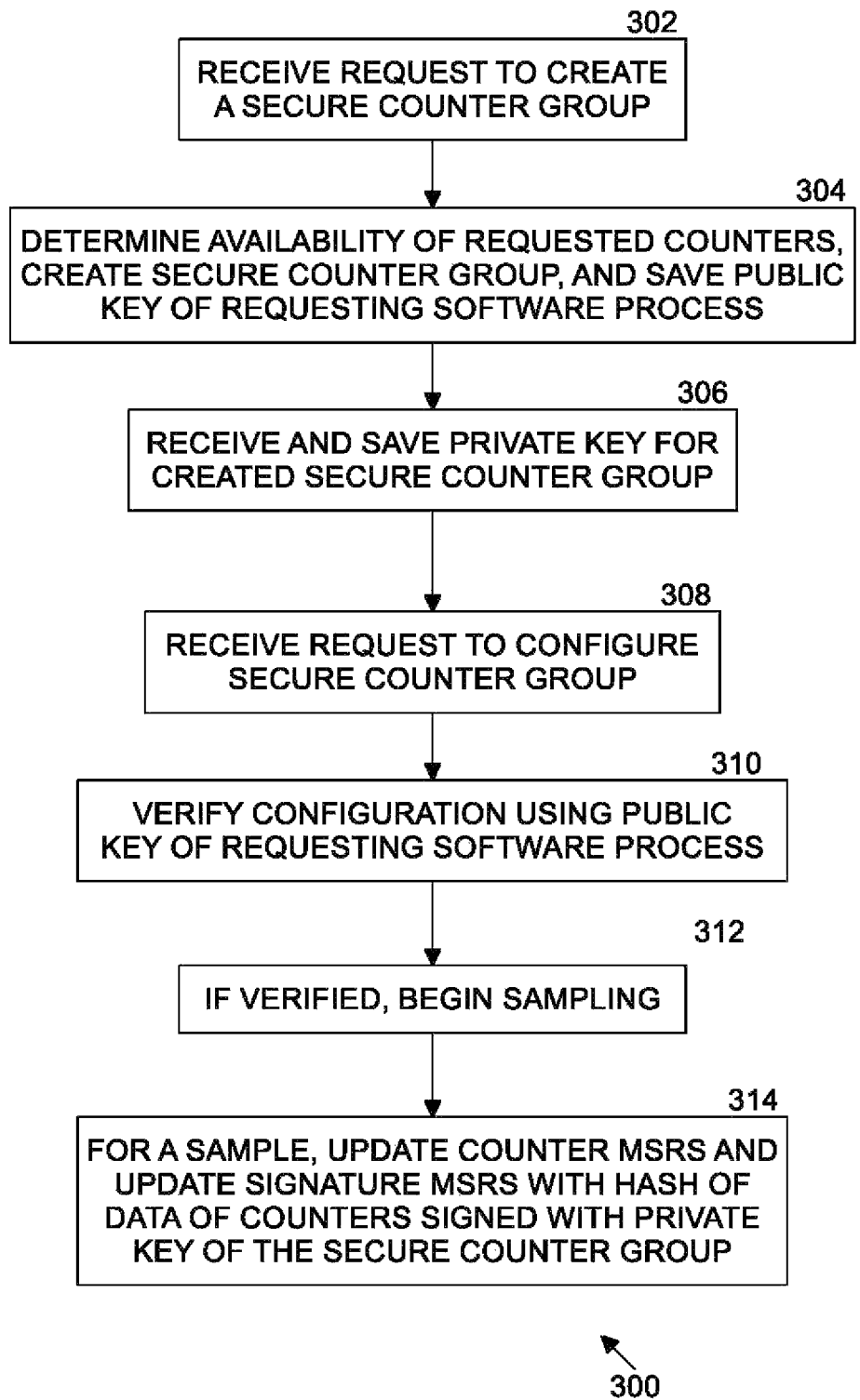
FIG. 3 is a flow diagram of secure group manager processing according to some embodiments.

FIG. 3 is a flow diagram of secure group manager processing 300 according to some embodiments. At block 302, secure group manager 126 of SPMU 102 receives a request to create a secure counter group with one or more counters from a SW process via security controller 216. At block 304, secure group manager 126 determines the availability of requested counters (e.g., those specified in the request), creates the secure counter group, assigns the one or more requested counters to the newly created secure counter group, and saves a public key of the requesting SW process (e.g., $S_{pub}$). In an embodiment, secure group manager assigns a group identifier (ID) to the newly created secure counter group and saves the group ID along with the SW process's public key. These actions reserve the one or more assigned counters to the newly created secure counter group and they cannot be reserved by another SW process until the secure counter group is deleted and the counters are freed.

At block 306, secure group manager 126 receives a private key for the secure counter group (e.g., $P_{priv}$) from security controller 216. Secure group manager 126 saves the private key for the secure counter group. Secure group manager 126 associates the saved private key is the group ID for the group. At block 308, secure group manager 126 receives a request to configure a secure counter group from a SW process via security controller 216. At block 310, secure group manager 126 verify the configuration being requested using the previously saved public key of the requesting SW process (e.g., $S_{pub}$). If the configuration is verified (e.g., the requested configuration came from the SW process that owns the secure counter group and the requested configuration is acceptable), sampling is begun. At block 314, for a sample, secure group manager 126 updates one or more counter MSRs 232 and updates one or more signatures MSRs 230 with a hash of the data of the counters in the secure counter group signed with the private key of the secure counter group (e.g., $P_{priv}$).

Figure 4:
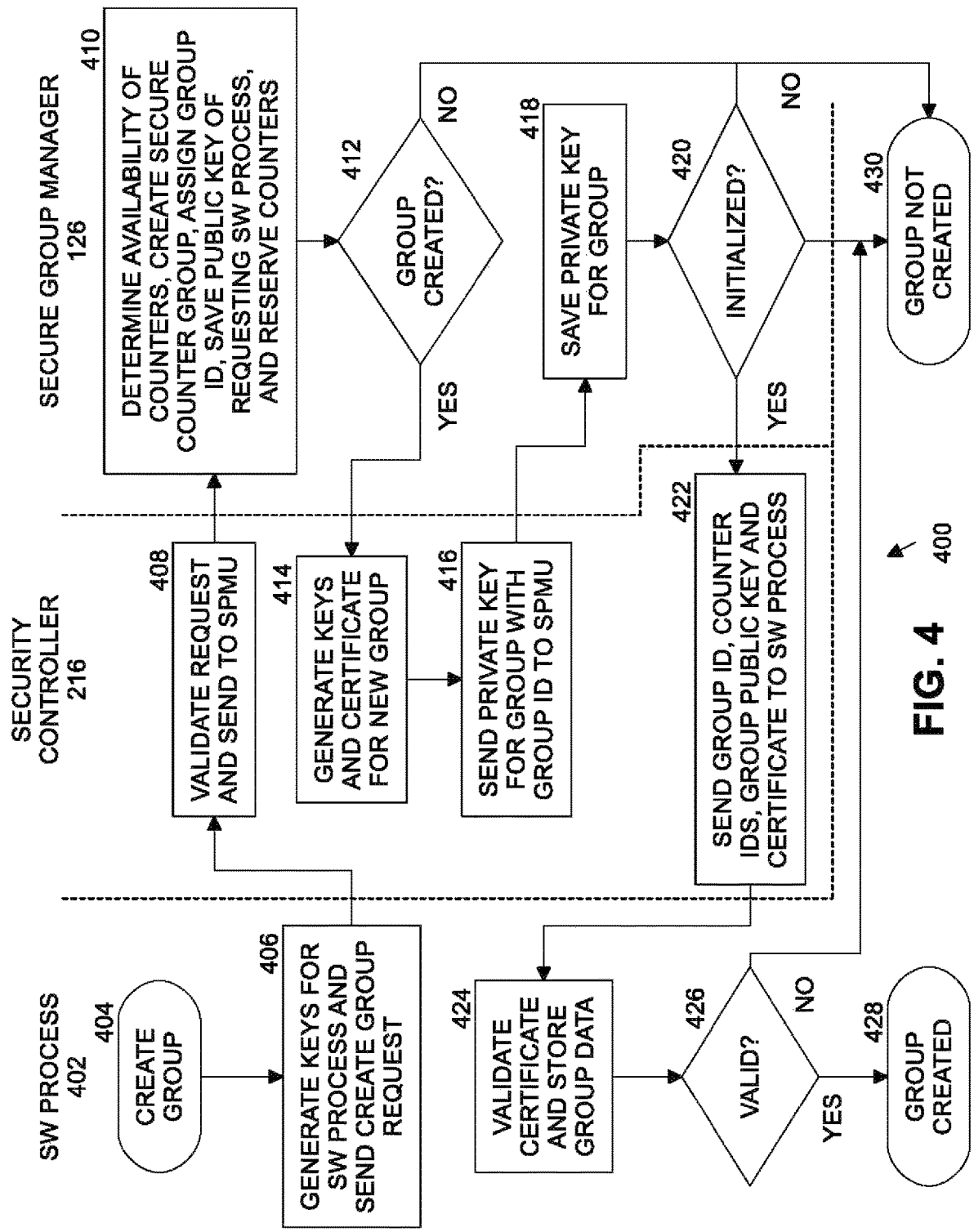
FIG. 4 is a flow diagram of create secure counter group processing according to some embodiments.

FIG. 4 is a flow diagram of create secure counter group processing 400 according to some embodiments. At block 404, when a SW process 402 needs to set up a secure counter group in SPMU 102 to monitor, count, and/or track one or more counters 104 of processor 100, SW process 402 starts a create group action. At block 406, the SW process 402 generates the keys for use by the SW process and sends a create group request to SPMU 102 via security controller 216. In an embodiment, the keys include a public key for the SW process ($S_{pub}$) and an associated private key for the SW process (e.g., $S_{priv}$). In an embodiment, the SW process generates a new key pair for each secure counter group requested to be created. The create group request may include a number of fixed counters 106, a number of general counters 108, and the public key of the SW process. In an embodiment, the create group request includes counter IDs of the counters (whether fixed or general) requested to be included in the group.

At block 408, security controller 216 receives the create group request, validates the request, and if validated, sends the create group request to secure group manager 126 in SPMU 102. At block 410, secure group manager 126 determines the availability of requested counters (e.g., those specified in the create group request), creates the secure counter group, assigns the one or more requested counters to the newly created secure counter group, and saves a public key of the requesting SW process (e.g., $S_{pub}$). In an embodiment, secure group manager assigns a group identifier (ID) to the newly created secure counter group and saves the group ID along with the SW process's public key (e.g., $S_{pub}$). These actions reserve the one or more assigned counters to the newly created secure counter group and they cannot be reserved by another SW process until the secure counter group is deleted and the counters are freed.

At block 412, secure group manager 126 checks if the secure counter group was successfully created. If not, the group was not created, and processing continues at block 430. In an embodiment, an error message may be returned to the requesting SW process 402 via security controller 216. If so, secure group manager 126 sends a positive status indication back to security controller 216 along with the group ID of the newly created group. At block 414, security controller generates keys for the newly created secure counter group along with a certificate. Thus, security controller 216 generates $P_{priv}$, $P_{pub}$, and $P_{pubCert}$. In an embodiment, the key pair is unique for every secure counter group being created. At block 416, security controller 216 sends the private key for the newly created group along with the group ID to secure group manager 126. At block 418, secure group manager 126 saves the private key $P_{priv}$ for the group. The exchange of the $P_{priv}$, $S_{pub}$, and counter set, and subsequent storage in local SPMU data storage, completes initialization of the secure counter group. At block 420, if initialization of the secure counter group failed, then the group was not created, and processing continues at block 430. In an embodiment, an error message may be returned to the requesting SW process 402 via security controller 216. If the initialization of the secure counter group was successful, secure group manager 126 notifies security controller 216, and the security controller sends the group ID, the counter IDs of counters in the secure counter group, the public key for the secure counter group $P_{pub}$, and the group certificate $P_{pubCert}$ to the SW process 402. At block 424, SW process 402 receives and stores this information and validates the certificate against a trusted RoT. If the certificate is invalid at block 426, create group processing has failed and processing ends at block 430. Otherwise, the group was created processing is complete at block 428.

Figure 5:
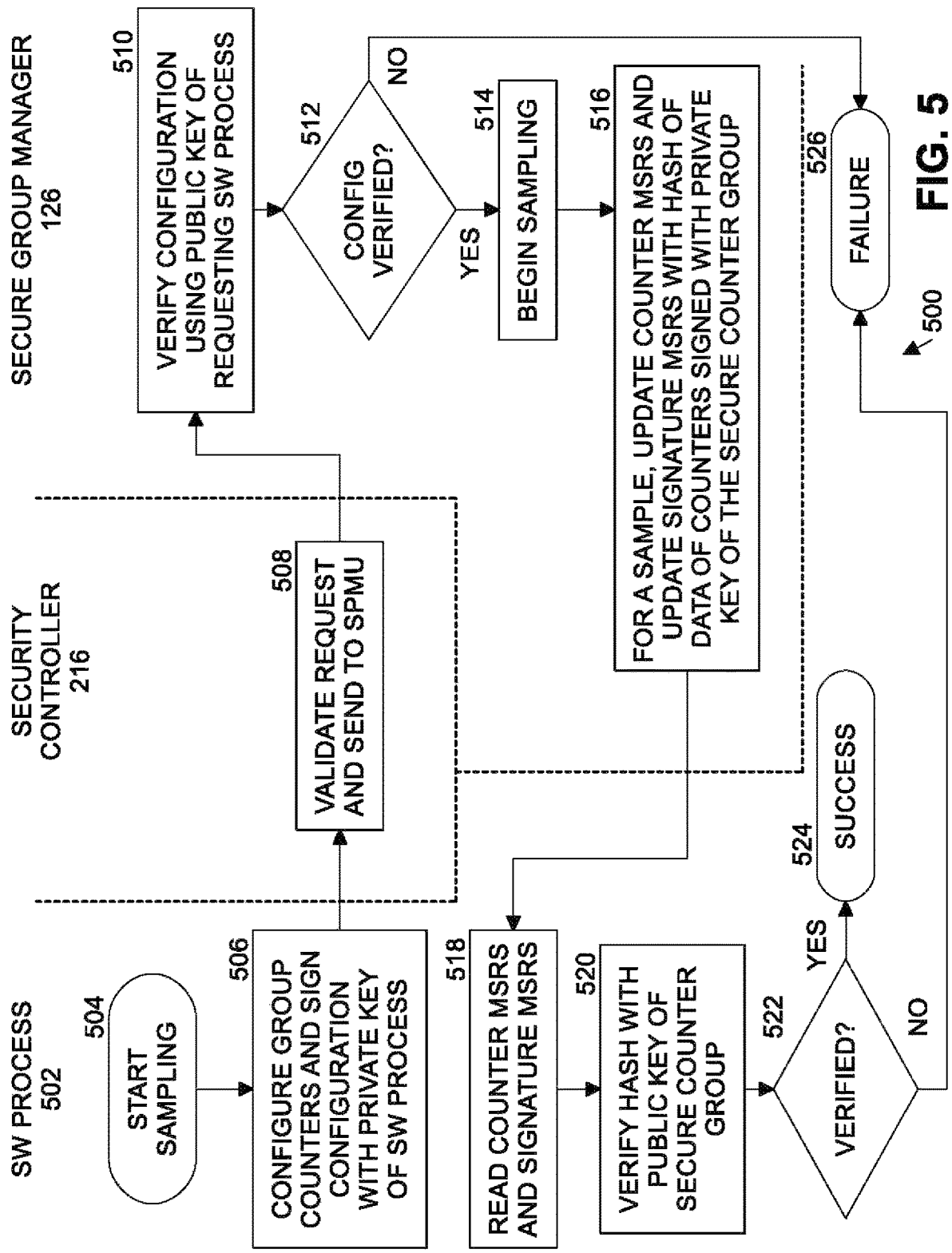
FIG. 5 is a flow diagram of starting sampling processing according to some embodiments.

FIG. 5 is a flow diagram of starting sampling processing 500 according to some embodiments. At block 504, sampling is started by SW process 502. At block 506, the SW process configures group counters to generate a configuration and signs the configuration with the private key of the SW process (e.g., $S_{priv}$). This may be represented as [ctr1config || ctr2config || ... ctrNconfig]$S_{priv}$ (where N is the number of counters in the configuration).

In an embodiment, this is the stage when the SW process configures the SPMU group's general counters to start monitoring the desired HW events the PMU is capable of monitoring. The counter configuration comprises a set of tuples for each general counter in the group. Each tuple will represent [counter ID, counter event config] (e.g., [GC1, event #||umask||cmask] || [GC2, Event #||umask||cmask] ... )

SW process 502 sends the configuration request to security controller 216. At block 508, security controller 216 validates the configuration request (e.g., for correct format and syntax), and if validated, sends the configuration request to secure group manager 126 of SPMU 102. If the configuration request is invalid, security controller 216 returns an error status to the requesting SW process 502. At block 510, secure group manager 126 receives a request to configure a secure counter group from a SW process via security controller 216 and the secure group manager verifies the configuration being requested using the previously saved public key of the requesting SW process (e.g., $S_{pub}$).

If the configuration is not verified at block 512, setting the configuration and starting sampling is a failure at block 526, and an error message may be returned to the SW process. If the configuration is verified (e.g., the requested configuration came from the SW process that owns the secure counter group and the requested configuration is acceptable), sampling is begun at block 514. At block 516, for a sample, secure group manager 126 updates one or more counter MSRs 232 and updates one or more signatures MSRs 230 with a hash of the data of the counters in the secure counter group signed with the private key of the secure counter group (e.g., $P_{priv}$). At block 518, for the current sample, SW process 502 reads the counter MSRs for counters associated with the secure counter group and the one or more signatures MSRs associated with the counters in the secure counter group. At block 520, the SW process 502 verifies the hash from the signature MSRs with the public key of the secure counter group (e.g., $P_{pub}$). If the hash is verified at block 522, then the sampling is a success at block 524 and the SW process can reliably and securely use the retrieved counter data. If the hash is not verified at block 522, a failure has occurred and sampling processing ends at block 526.

Figure 6:
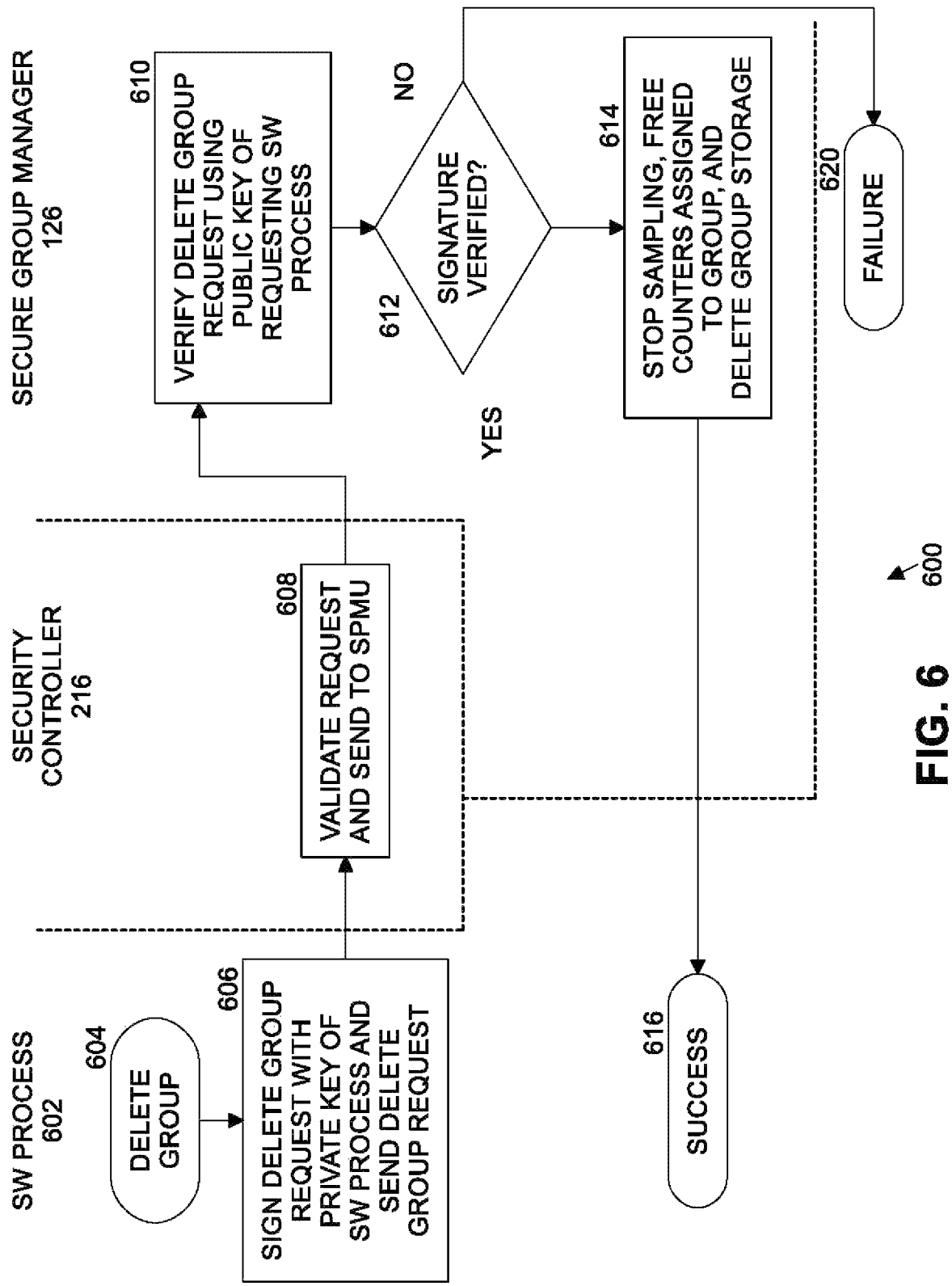
FIG. 6 is a flow diagram of delete secure counter group processing according to some embodiments.

FIG. 6 is a flow diagram of delete secure counter group processing 600 according to some embodiments. When a secure counter group is no longer needed by the SW process that created the group, the group can be deleted to free the assigned counters for use by other SW processes. At block 604, delete group processing is started by SW process 602. At block 606, SW process 602 signs a delete group request (including the group ID of the group to be deleted) with the private key of the SW process ($S_{priv}$) and sends the delete group request to the security controller 216. This may be represented at [group ID || auxiliary data]$S_{priv}$. At block 608, security controller 216 validates the request, and if validated, sends the delete group request to secure group manager 126 in SPMU 102. If the delete group request is invalid, security controller 216 returns an error status to the requesting SW process 602. At block 610, secure group manager 126 receives the delete group request, and verifies the delete group request using the public key of the requesting SW process (e.g., $S_{pub}$). At block 612, if the signature is not verified, then a failure for the delete group request is indicated at block 620 and an error message may be returned to the SW process. An error may occur, for example, if the SW process requesting to delete the secure counter group identified by the group ID is not the SW process that created the secure counter group. However, sampling for the counters of the secure counter group continues.

At block 612, if the signature is verified, then the SW process requesting the deleting of the group is the same SW process that created the group. At block 614, secure group manager 126 stops sampling, frees the counters assigned to the secure counter group (so that they can be reassigned to another group in future), and deletes any storage associated with the now deleted secure counter group. For example, this may include the public key of the SW process that created/deleted the group ($S_{pub}$), and the private key of the secure counter group ($P_{priv}$). Delete group processing ends at success block 616.

Embodiments provide a HW-based means of preventing tampering with PMU counters and enables HW RoT-backed verifiability of PMU configurations of secure counter groups and of counter data. This technology opens up a host of security use cases for the PMU counter data that is currently primarily used for workload optimization in debug environments. Threat profiling and monitoring SW (such as anti-virus (AV), endpoint platform protection (EPP), and endpoint detection and response (EDR) can use the capability described herein to securely and predictably monitor for malicious, as well as anomalous, activities with PMU telemetry data. Counter data can be collected in secure containers (e.g., such as like Intel® Software Guard Extensions (SGX) and Intel® Trust Domain Extensions (TDX) with tamper protection for processing. For example, this technology improves the security of solutions such as Intel® Threat Detection Technology (TDT) that depends on untampered and consistent PMU configurations and counter data.

Figure 7:
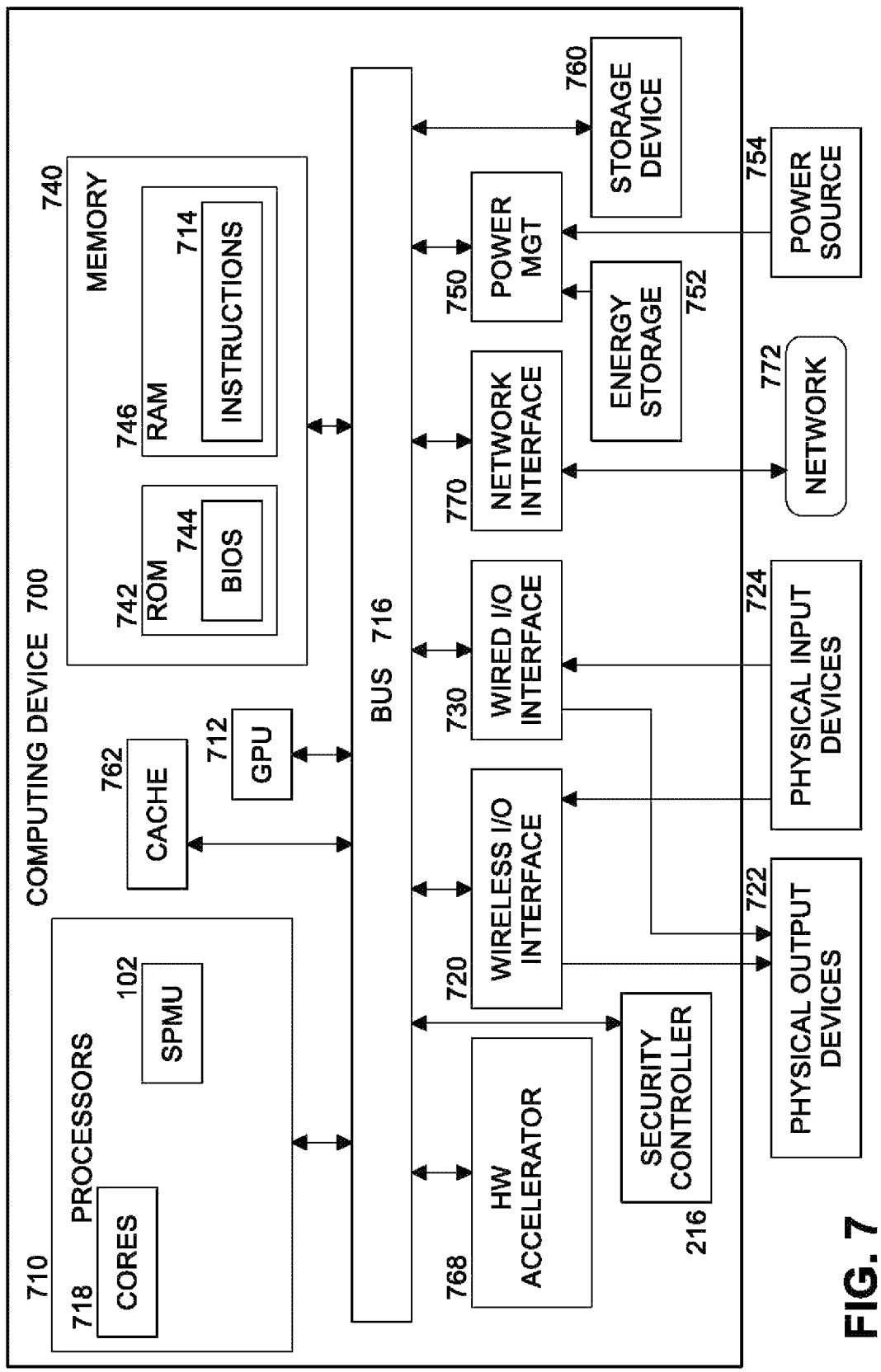
FIG. 7 is a schematic diagram of an illustrative electronic computing device to perform security processing according to some embodiments.

FIG. 7 is a schematic diagram of an illustrative electronic computing device to perform security processing according to some embodiments. In some embodiments, computing device 700 includes one or more processors 710 including SPMU 102. In some embodiments, the computing device 700 includes one or more hardware accelerators 768.

In some embodiments, the computing device is to implement security processing, as provided in FIGS. 1-6 above.

The computing device 700 may additionally include one or more of the following: cache 762, a graphical processing unit (GPU) 712 (which may be the hardware accelerator in some implementations), a wireless input/output (I/O) interface 720, a wired I/O interface 730, system memory 740, power management circuitry 780, non-transitory storage device 760, and a network interface 770 for connection to a network 772. The following discussion provides a brief, general description of the components forming the illustrative computing device 700. Example, non-limiting computing devices 700 may include a desktop computing device, blade server device, workstation, laptop computer, mobile phone, tablet computer, personal digital assistant, or similar device or system.

In embodiments, the processor cores 718 are capable of executing machine-readable instruction sets 714, reading data and/or machine-readable instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 714 may include instructions to implement security processing, as provided in FIGS. 1-6.

The processor cores 718 may include any number of hardwired or configurable circuits, some or all of which may include programmable and/or configurable combinations of electronic components, semiconductor devices, and/or logic elements that are disposed partially or wholly in a PC, server, mobile phone, tablet computer, or other computing system capable of executing processor-readable instructions.

The computing device 700 includes a bus 716 or similar communications link that communicably couples and facilitates the exchange of information and/or data between various system components including the processor cores 718, the cache 762, the graphics processor circuitry 712, one or more wireless I/O interface 720, one or more wired I/O interfaces 730, one or more storage devices 760, and/or one or more network interfaces 770. The computing device 700 may be referred to in the singular herein, but this is not intended to limit the embodiments to a single computing device 700, since in certain embodiments, there may be more than one computing device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art. The bus 716 that interconnects at least some of the components of the computing device 700 may employ any currently available or future developed serial or parallel bus structures or architectures.

The system memory 740 may include read-only memory ("ROM") 742 and random-access memory ("RAM") 746. A portion of the ROM 742 may be used to store or otherwise retain a basic input/output system ("BIOS") 744. The BIOS 744 provides basic functionality to the computing device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, a neural network, a machine learning model, or similar devices.

The computing device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include but are not limited to universal serial bus (USB), IEEE 1394 ("FireWire"), and similar.

The computing device 700 may include one or more communicably coupled, non-transitory, storage devices 760. The storage devices 760 may include one or more hard disk drives (HDDs) and/or one or more solid-state storage devices (SSDs). The one or more storage devices 760 may include any current or future developed storage appliances, network storage devices, and/or systems. Non-limiting examples of such storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more storage devices 760 may include one or more removable storage devices, such as one or more flash drives, flash memories, flash storage units, or similar appliances or devices capable of communicable coupling to and decoupling from the computing device 700.

The one or more storage devices 760 may include interfaces or controllers (not shown) communicatively coupling the respective storage device or system to the bus 716. The one or more storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interface 720 (e.g., Bluetooth®, Near Field Communication or NFC); and/or one or more network interfaces 770 (IEEE 802.3 or Ethernet, IEEE 802.11, or Wi-Fi®, etc.).

Machine-readable instruction sets 714 and other programs, applications, logic sets, and/or modules may be stored in whole or in part in the system memory 740. Such machine-readable instruction sets 714 may be transferred, in whole or in part, from the one or more storage devices 760. The machine-readable instruction sets 714 may be loaded, stored, or otherwise retained in system memory 740, in whole or in part, during execution by the processor cores 718 and/or graphics processor circuitry 712.

The computing device 700 may include power management circuitry 780 that controls one or more operational aspects of the energy storage device 782. In embodiments, the energy storage device 782 may include one or more primary (i.e., non-rechargeable) or secondary (i.e., rechargeable) batteries or similar energy storage devices. In embodiments, the energy storage device 782 may include one or more supercapacitors or ultracapacitors. In embodiments, the power management circuitry 780 may alter, adjust, or control the flow of energy from an external power source 784 to the energy storage device 782 and/or to the computing device 700. The external power source 784 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

Flow charts representative of example hardware logic, machine readable instructions, hardware implemented state machines, and/or any combination thereof for implementing computing device 700, for example, are shown in FIGS. 3-6. The machine-readable instructions may be one or more executable programs or portion(s) of an executable program for execution by a computer processor such as the processor 710 shown in the example computing device 700 discussed above in connection with FIG. 7. The program may be embodied in software stored on a non-transitory computer readable storage medium such as a CD-ROM, a floppy disk, a hard drive, a DVD, a Blu-ray disk, or a memory associated with the processor 710, but the entire program and/or parts thereof could alternatively be executed by a device other than the processor 710 and/or embodied in firmware or dedicated hardware. Further, although the example program is described with reference to the flow charts illustrated in FIGS. 3-6, many other methods of implementing the example computing device 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-6 may be implemented using executable instructions (e.g., computer and/or machine-readable instructions) stored on a non-transitory computer and/or machine-readable medium such as a hard disk drive, a solid-state storage device (SSD), a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is an apparatus including one or more performance monitoring counters and a secure group manager. The secure group manager is to receive a request to create a secure counter group from a software (SW) process being executed by a processor, the request including identification of the one or more performance monitoring counters; determine availability of the one or more performance monitoring counters, creating the secure counter group, assign the one or more performance monitoring counters to the secure counter group, and save a public key of the SW process, when the one or more performance monitoring counters are available; receive and save a private key for the secure counter group; receive a request to configure the secure counter group from the SW process; verify the configuration using the public key of the SW process; and start sampling of the one or more performance monitoring counters when the configuration is verified.

In Example 2, the subject matter of Example 1 can optionally include one or more counter model specific registers (MSRs); and one or more signature MSRs; wherein the secure group manager to, for a sample, update the one or more counter MSRs, and update the one or more signature MSRs with a hash of data of the performance monitoring counters signed with the private key of the secure counter group.

In Example 3, the subject matter of Example 1 can optionally include the secure group manager to generate an interrupt when sampling completes a sampling interval.

In Example 4, the subject matter of Example 3 can optionally include wherein only the SW process sending the request to create the secure counter group can verify the one or more counter MSRs and the one or more signature MSRs in response to the interrupt.

In Example 5, the subject matter of Example 1 can optionally include the secure group manager to receive a request to delete the secure counter group; verify the request to delete the secure counter group using the public key of the SW process; and stop sampling of the one or more performance monitoring counters assigned to the secure counter group, free the one or more performance monitoring counters, and delete the secure counter group, when the request to delete the secure counter group is verified.

In Example 6, the subject matter of Example 1 can optionally include wherein the one or more performance monitoring counters include zero or more fixed counters and zero or more programmable general counters.

In Example 7, the subject matter of Example 1 can optionally include wherein the one or more performance monitoring counters are assigned to only one secure counter group at a time.

Example 8 is a method including receiving, in a secure performance monitoring unit (SPMU) of a processor, a request to create a secure counter group in the SPMU from a software (SW) process being executed by the processor, the request including identification of one or more performance monitoring counters of the SPMU; determining availability of the one or more performance monitoring counters, creating the secure counter group, assigning the one or more performance monitoring counters to the secure counter group, and saving a public key of the SW process, when the one or more performance monitoring counters are available; receiving and saving a private key for the secure counter group; receiving a request to configure the secure counter group from the SW process; verifying the configuration using the public key of the SW process; and starting sampling of the one or more performance monitoring counters when the configuration is verified.

In Example 9, the subject matter of Example 8 can optionally include for a sample, updating one or more counter model specific registers (MSRs) of the SPMU and updating one or more signature MSRs of the SPMU with a hash of data of the performance monitoring counters signed with the private key of the secure counter group.

In Example 10, the subject matter of Example 8 can optionally include generating an interrupt when sampling completes a sampling interval.

In Example 11, the subject matter of Example 10 can optionally include wherein only the SW process sending the request to create the secure counter group can verify the one or more counter MSRs and the one or more signature MSRs in response to the interrupt.

In Example 12, the subject matter of Example 8 can optionally include receiving a request to delete the secure counter group; verifying the request to delete the secure counter group using the public key of the SW process; and stopping sampling of the one or more performance monitoring counters assigned to the secure counter group, freeing the one or more performance monitoring counters, and deleting the secure counter group, when the request to delete the secure counter group is verified.

In Example 13, the subject matter of Example 8 can optionally include wherein the one or more performance monitoring counters include zero or more fixed counters and zero or more programmable general counters.

In Example 14, the subject matter of Example 8 can optionally include wherein the one or more performance monitoring counters are assigned to only one secure counter group at a time.

Example 15 is at least one non-transitory machine-readable storage medium comprising instructions that, when executed, cause at least one processing device to at least receive, in a secure performance monitoring unit (SPMU) of a processor, a request to create a secure counter group in the SPMU from a software (SW) process being executed by the processor, the request including identification of one or more performance monitoring counters of the SPMU; determine availability of the one or more performance monitoring counters, creating the secure counter group, assign the one or more performance monitoring counters to the secure counter group, and save a public key of the SW process, when the one or more performance monitoring counters are available; receive and save a private key for the secure counter group; receive a request to configure the secure counter group from the SW process; verify the configuration using the public key of the SW process; and start sampling of the one or more performance monitoring counters when the configuration is verified.

In Example 16, the subject matter of Example 15 can optionally include instructions to, for a sample, update one or more counter model specific registers (MSRs) of the SPMU and update one or more signature MSRs of the SPMU with a hash of data of the performance monitoring counters signed with the private key of the secure counter group.

In Example 17, the subject matter of Example 15 can optionally include instructions to receive a request to delete the secure counter group; verify the request to delete the secure counter group using the public key of the SW process; and stopping sampling of the one or more performance monitoring counters assigned to the secure counter group, free the one or more performance monitoring counters, and delete the secure counter group, when the request to delete the secure counter group is verified.

Example 18 is a method including sending a create group request to a secure performance monitoring unit (SPMU) of a processor to create a secure counter group, the create group request including identification (ID) of one or more performance monitoring counters of the SPMU to be included in the secure counter group and a public key of a cryptographic key pair for a software (SW) process; receiving an identifier of the secure counter group, IDs of the one or more performance monitoring counters assigned to the secure counter group, a public key of the secure counter group, and a certificate of the secure counter group; and validating the certificate of the secure counter group against a trusted root of trust of the processor.

In Example 19, the subject matter of Example 18 can optionally include configuring the one or more performance monitoring counters of the secure counter group to generate a configuration and signing the configuration with a private key of the SW process; sending a configuration request to the secure performance monitoring unit to configure the one or more performance monitoring counters; reading one or more counter model specific registers (MSRs) and one or more signature MSRs of the secure performance monitoring unit; and verifying a hash of data of the performance monitoring counters signed with a private key of the secure counter group using the public key of the secure counter group.

In Example 20, the subject matter of Example 19 can optionally include signing a delete group request with the private key of the SW process and sending the delete group request to the secure performance monitoring unit.

Example 21 provides an apparatus comprising means for performing the method of any one of Examples 8-14 or 18-20.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:
   processor circuitry coupled to a memory, the processor circuitry to facilitate a secure group manager to:
   receive a request to create a secure counter group from a software (SW) process being executed by a processor, the request including identification of one or more performance monitoring counters;
determine availability of the one or more performance monitoring counters, creating the secure counter group, assign the one or more performance monitoring counters to the secure counter group, and save a public key of the SW process, when the one or more performance monitoring counters are available;
receive and save a private key for the secure counter group;
receive a request to configure the secure counter group from the SW process;
verify the configuration using the public key of the SW process; and
start sampling of the one or more performance monitoring counters when the configuration is verified.

2. The apparatus of claim 1,:
wherein processor circuitry is further to facilitate the secure group manager to, for a sample, update one or more counter model specific registers (MSRs), and update one or more signature MSRs with a hash of data of the performance monitoring counters signed with the private key of the secure counter group.

3. The apparatus of claim 2, wherein the processor circuitry is further to facilitate the secure group manager to generate an interrupt when sampling completes a sampling interval.

4. The apparatus of claim 3, wherein the SW process sending the request to create the secure counter group verifies the one or more counter MSRs and the one or more signature MSRs in response to the interrupt.

5. The apparatus of claim 1, wherein the processor circuitry is further to facilitate the secure group manager to:
receive a request to delete the secure counter group;
verify the request to delete the secure counter group using the public key of the SW process; and
stop sampling of the one or more performance monitoring counters assigned to the secure counter group, free the one or more performance monitoring counters, and delete the secure counter group, when the request to delete the secure counter group is verified.

6. The apparatus of claim 1, wherein the one or more performance monitoring counters include zero or more fixed counters and zero or more programmable general counters.

7. The apparatus of claim 1, wherein the one or more performance monitoring counters are assigned to one secure counter group at a time.

8. A method comprising:
receiving, in a secure performance monitoring unit (SPMU) of a processor of a computing device, a request to create a secure counter group in the SPMU from a software (SW) process being executed by the processor, the request including identification of one or more performance monitoring counters of the SPMU;
determining availability of the one or more performance monitoring counters, creating the secure counter group, assigning the one or more performance monitoring counters to the secure counter group, and saving a public key of the SW process, when the one or more performance monitoring counters are available;
receiving and saving a private key for the secure counter group;
receiving a request to configure the secure counter group from the SW process;
verifying the configuration using the public key of the SW process; and
starting sampling of the one or more performance monitoring counters when the configuration is verified.

9. The method of claim 8, comprising:
for a sample, updating one or more counter model specific registers (MSRs) of the SPMU and updating one or more signature MSRs of the SPMU with a hash of data of the performance monitoring counters signed with the private key of the secure counter group.

10. The method of claim 9, comprising generating an interrupt when sampling completes a sampling interval.

11. The method of claim 10, wherein the SW process sending the request to create the secure counter group verifies the one or more counter MSRs and the one or more signature MSRs in response to the interrupt.

12. The method of claim 8, comprising:
receiving a request to delete the secure counter group;
verifying the request to delete the secure counter group using the public key of the SW process; and
stopping sampling of the one or more performance monitoring counters assigned to the secure counter group, freeing the one or more performance monitoring counters, and deleting the secure counter group, when the request to delete the secure counter group is verified.

13. The method of claim 8, wherein the one or more performance monitoring counters include zero or more fixed counters and zero or more programmable general counters.

14. The method of claim 8, wherein the one or more performance monitoring counters are assigned to one secure counter group at a time.

15. At least one non-transitory machine-readable storage medium comprising instructions that, when executed, cause at least one processing device to:
receive, in a secure performance monitoring unit (SPMU), a request to create a secure counter group in the SPMU from a software (SW) process being executed by the processor, the request including identification of one or more performance monitoring counters of the SPMU;
determine availability of the one or more performance monitoring counters, creating the secure counter group, assign the one or more performance monitoring counters to the secure counter group, and save a public key of the SW process, when the one or more performance monitoring counters are available;
receive and save a private key for the secure counter group;
receive a request to configure the secure counter group from the SW process;
verify the configuration using the public key of the SW process; and
start sampling of the one or more performance monitoring counters when the configuration is verified.

16. The at least one non-transitory machine-readable storage medium of claim 15, comprising instructions that, when executed, cause at least one processing device to:
for a sample, update one or more counter model specific registers (MSRs) of the SPMU and update one or more signature MSRs of the SPMU with a hash of data of the performance monitoring counters signed with the private key of the secure counter group.

17. The at least one non-transitory machine-readable storage medium of claim 15, comprising instructions that, when executed, cause at least one processing device to:
receive a request to delete the secure counter group;
verify the request to delete the secure counter group using the public key of the SW process; and
stopping sampling of the one or more performance monitoring counters assigned to the secure counter group, free the one or more performance monitoring counters, and delete the secure counter group, when the request to delete the secure counter group is verified.

18. A method comprising:

sending a create group request to a secure performance monitoring unit (SPMU) of a processor of a computing device to create a secure counter group, the create group request including identification (ID) of one or more performance monitoring counters of the SPMU to be included in the secure counter group and a public key of a cryptographic key pair for a software (SW) process;

receiving an identifier of the secure counter group, IDs of the one or more performance monitoring counters assigned to the secure counter group, a public key of the secure counter group, and a certificate of the secure counter group; and validating the certificate of the secure counter group against a trusted root of trust of the processor.

19. The method of claim 18, comprising:

configuring the one or more performance monitoring counters of the secure counter group to generate a configuration and signing the configuration with a private key of the SW process;

sending a configuration request to the secure performance monitoring unit to configure the one or more performance monitoring counters;

reading one or more counter model specific registers (MSRs) and one or more signature MSRs of the secure performance monitoring unit; and verifying a hash of data of the performance monitoring counters signed with a private key of the secure counter group using the public key of the secure counter group.

20. The method of claim 19, comprising:

signing a delete group request with the private key of the SW process and sending the delete group request to the secure performance monitoring unit.

\* \* \* \* \*